United States Patent [19]
Giuliani et al.

[11] Patent Number: 4,803,890
[45] Date of Patent: Feb. 14, 1989

[54] PISTON/POWER SHAFT COUPLING

[76] Inventors: Robert L. Giuliani, 1456 Thurston Ave. A-1204, Honolulu, Hi. 96822; Karen A. Giuliani; Mark A. Giuliani, both of 45-310 Akimala Pl., Kaneohe, Hi. 96744

[21] Appl. No.: 125,882

[22] Filed: Nov. 27, 1987

[51] Int. Cl.[4] ............... F16H 19/04; F16H 21/22; F16H 29/20
[52] U.S. Cl. ............................ 74/131; 74/32; 74/50; 123/197 AC
[58] Field of Search ............ 74/32, 50, 130, 131; 123/197 R, 197 AB, 197 AC

[56] References Cited

U.S. PATENT DOCUMENTS

| | | | |
|---|---|---|---|
| 813,736 | 2/1906 | Pendleton | 74/50 |
| 1,349,661 | 8/1920 | Buhl | 74/50 |
| 1,490,611 | 4/1924 | Kellum | 74/32 |
| 1,841,021 | 1/1932 | Everts | 74/32 |
| 2,470,246 | 5/1949 | Heisman | 74/32 |
| 4,498,430 | 2/1985 | Giuliani et al. | 123/197 AB X |
| 4,632,081 | 12/1986 | Giuliani et al. | 123/198 |

FOREIGN PATENT DOCUMENTS

| | | | |
|---|---|---|---|
| 607478 | 3/1959 | Italy | 74/131 |
| 189717 | 6/1937 | Switzerland | 74/32 |
| 468652 | 7/1937 | United Kingdom | 74/32 |

*Primary Examiner*—Allan D. Herrmann

[57] ABSTRACT

The conventional crank between the power piston and the crank shaft in a reciprocating engine is replaced by a fixed length moment arm during the power stroke and a scotch yoke during the return stroke.

The motion of a power piston is converted to rotary motion at an output power shaft through the fixed length moment arm. The moment arm is the radius of a sector gear which is non-rotatably secured to the output shaft. The piston rod is modified to include a rack gear and a slot. The slot and the output shaft form the scotch yoke.

The sector gear engages the rack only during the down stroke of the piston. The sector gear disengages just before the down stroke is completed. The piston is then timely returned to the precise position of its next stroke through the scotch yoke.

The fixed length moment arm acts as a lever through the entire stroke of the pistion which reduces combustion pressure and temperature. The reduced combustion pressure permits a smaller combustion charge which saves fuel. The reduced pressure and combustion reduce exhaust pollutants. The stroke can be longer than the conventional crank, thereby applying the power through a greater angular displacement of the power shaft.

Instant torque is achieved through the moment arm.

The invention can be either the two or four stroke type.

5 Claims, 3 Drawing Sheets

PISTON/POWER SHAFT COUPLING

CROSS REFERENCE TO RELATED APPLICATIONS

This application is related to prior application Ser. No. 804,101, filed Dec. 3, 1985, now abandoned.

FIELD OF THE INVENTION

This invention converts the linear motion of a power piston to rotary motion of a power output shaft.

BACKGROUND OF THE INVENTION

The conventional coupling between the engine's power piston and the crankshaft is very inefficient. Take the diesel, for instance. The fuel charge is fired when the piston is at, or very near top dead center (TDC). The moment arm is at or close to zero, or even negative. The combustion takes place so fast that a significant part of the power loaded combustion gases rush past the piston into the crankcase where it serves only to dirty the lube oil while another significant part is wasted as excess heat. The power carried by the bypass gases should be imparted to the piston for transmission to the power output shaft.

The present trend in engine design is to increase engine rpm using the conventional piston rod. The piston stroke is short and the time available for drawing air into the combustion chamber is very short. This causes combustion at less than the ideal 15:1 air/fuel ratio for the hydrocarbon fuel which, in turn, leaves unburned fuel to be exhausted as pollutants into the atmosphere. With the exhausted unburned fuel goes wasted energy which should have been converted to power to drive the piston. A greater quantity of air is then pumped into the combustion chamber for each charge with turbo or super chargers, often using intercoolers. Additional expensive intake valves are also placed in each cylinder to facilitate the additional air intake. All these techniques require rapidly moving additional parts and their precise synchronization which leads to more frequent and expensive engine break downs. Other disadvantages of this trend could be cited. The present trend really just covers up the real problem, which is the inefficient coupling between the piston rod and crankshaft, rather than removing the problem.

One of the best ways to surmount the inefficiency in the piston rod/crankshaft coupling is to create a fixed length moment arm extending from the axis of the crankshaft to a point where the entire force of the piston is perpendicularly applied to the moment arm. This solution places higher torque power at the output shaft. High torque power is what is needed by cars, trucks and other surface vehicles as well as helicopters and ships.

The inventors' earlier invention, "LINEAR RECIPROCATING PISTON ENGINE", U.S. Pat. No. 4,498,430 as corrected, disclosed a mechanism that applied the piston's force perpendicularly to a fixed length moment arm to rotate the output shaft. The present invention uses the same principle. However, timing gears and an oscillating gear found in the earlier invention have been eliminated from the present invention to lower the manufacturing costs and reduce the number of moving parts.

SUMMARY OF THE INVENTION

An engine's piston power is converted to rotational power at the output shaft through an efficient coupling by taking advantage of a fixed length moment arm.

A piston rod is part of a piston plate which is restricted to linear reciprocating motion. It is provided with a rack gear and a two part slot therethrough. The rack gear engages a sector gear carried by a crankshaft to transmit the power from the piston to the shaft. The length of the moment arm is equal to the radius of the sector gear. The power is transmitted perpendicular to the moment arm. This arrangement applies more of the piston's power to the output shaft and over a greater part of the power stroke than is possible with a conventional coupling between the piston rod and crankshaft.

The rack and sector gear are disengaged when the piston's motion is opposite the power stroke. A scotch yoke between the plate and the power shaft raises the piston to its topmost position to begin another power or intake stroke. For a given fuel charge against a given shaft load, the fixed length moment arm increases torque power at the output shaft over conventional couplings between piston rod and crankshaft.

An object of the invention is to increase the efficiency of a piston engine with a more efficient coupling between the piston and the power shaft.

Another object is to make an engine with low combustion pressure and temperature that could use low energy, high octane, renewable fuel competitively, i.e. alcohol fuel.

Another object is to obtain maximum energy from fuel and convert it to high torque at the output shaft.

Other objects and advantages of the invention will become obvious upon further perusal of this disclosure.

DESCRIPTION OF THE PREFERRED EMBODIMENT

Figure 1:
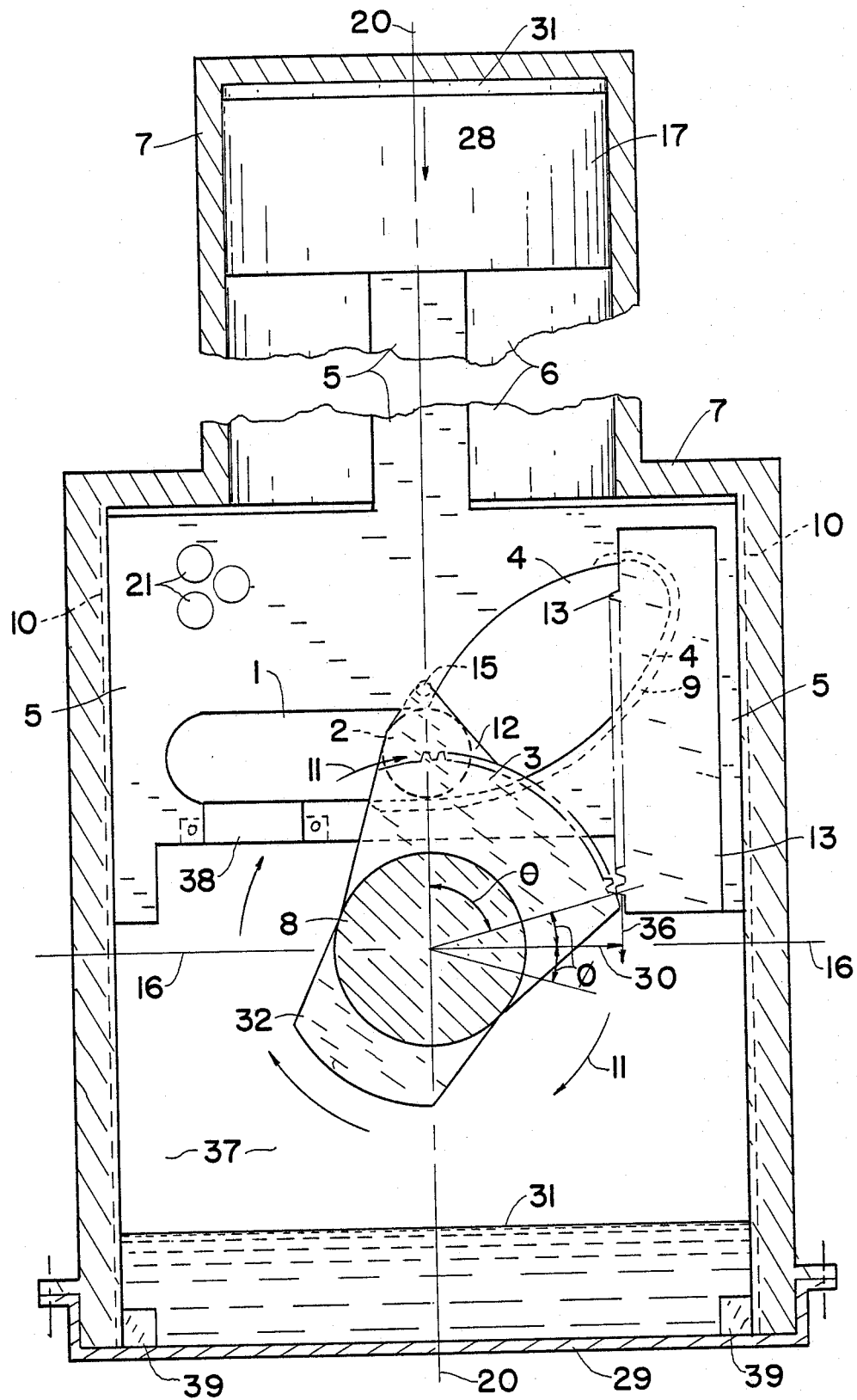
FIG. 1 is a front elevational view in cross section showing the main elements in relation to each other when the piston begins the power stroke.

A coupling between two essential elements in a common housing transmits motion between linear and rotational. The first essential element, adapted for linear reciprocal movement, is a piston rod plate 5. The second essential element, adapted for rotational movement, is the power output shaft 8. The preferred embodiment also uses a power piston 17 in its cylinder 6; rack gear 13; sector gear 3; crank arms 12, 22; crank pin 2; a two-part slot 1, 4 through plate 5; guide rail 9; guide pin 15; the common housing 7; slide groove 10. For orientation, center line 10 and line 16 are fixed in a common plane and the rotational axis 25 of output shaft 8 is fixed in its plane.

The lightweight plate 5 can either be connected to piston 17 at its extended piston rod end, or plate 5 and piston 17 can be a single element. The movement of piston 17 and plate 5 are integral and confined to essentially reciprocating linearly along line 20.

The plate 5 is of a strong, rigid, lightweight material that can withstand the environment of the engine's crankcase 37 while transmitting the force upon piston 17—shown by the force vector 28—to the rack gear 13. Rack gear 13 is preferably an integral part of plate 5. Holes 21 may be drilled through plate 5 in a matrix to reduce its weight which reduces the inertial forces resulting from its rapid back and forth movement.

Plate 5 is shown fitted into gooves 10 which are cut into the engine housing 7. Grooves 10 are one way to keep plate 5 sliding along a linear reciprocal path without wobbling or deviating. There are also other satisfactory ways of confining the movement of plate 5.

Oil pan 29 serves its usual function of retaining oil 31 in the crankcase 37.

An opening to the slot 1 is made in plate 5. This opening serves to permit pin 2 to be removed from the two part slot 1, 4 during disassembly of the mechanism and replaced during reassembly. The opening is shown in FIG. 1 fitted with an insert 38. The insert 38 contributes to the rigidity of plate 5.

The crankshaft 8 has counterweights 32 to effect the usual equilibrium. For each piston 17, and there may be several, the crankshaft 8 has a pair of crank arms 12, 22 which are connected by the crank pin 2. The sector gear 3 is preferably a part of crank arm 12 as particularly shown in FIGS. 4 and 6. The crank pin 2 and crank arms 12, 22 must be strong enough to transmit power between adjoining segments of crankshaft 8 just as done in conventional piston engines. Crankshaft 8 is conventionally journaled in housing 7.

The crank pin 2 extends through the two part slot 1, 4 in the plate 5. The pin 2 conventionally revolves around the rotational axis 25 (shown in FIG. 4) of the crankshaft 8 as indicated by arrows 11 in FIGS. 1, 2, 3.

Figure 4:
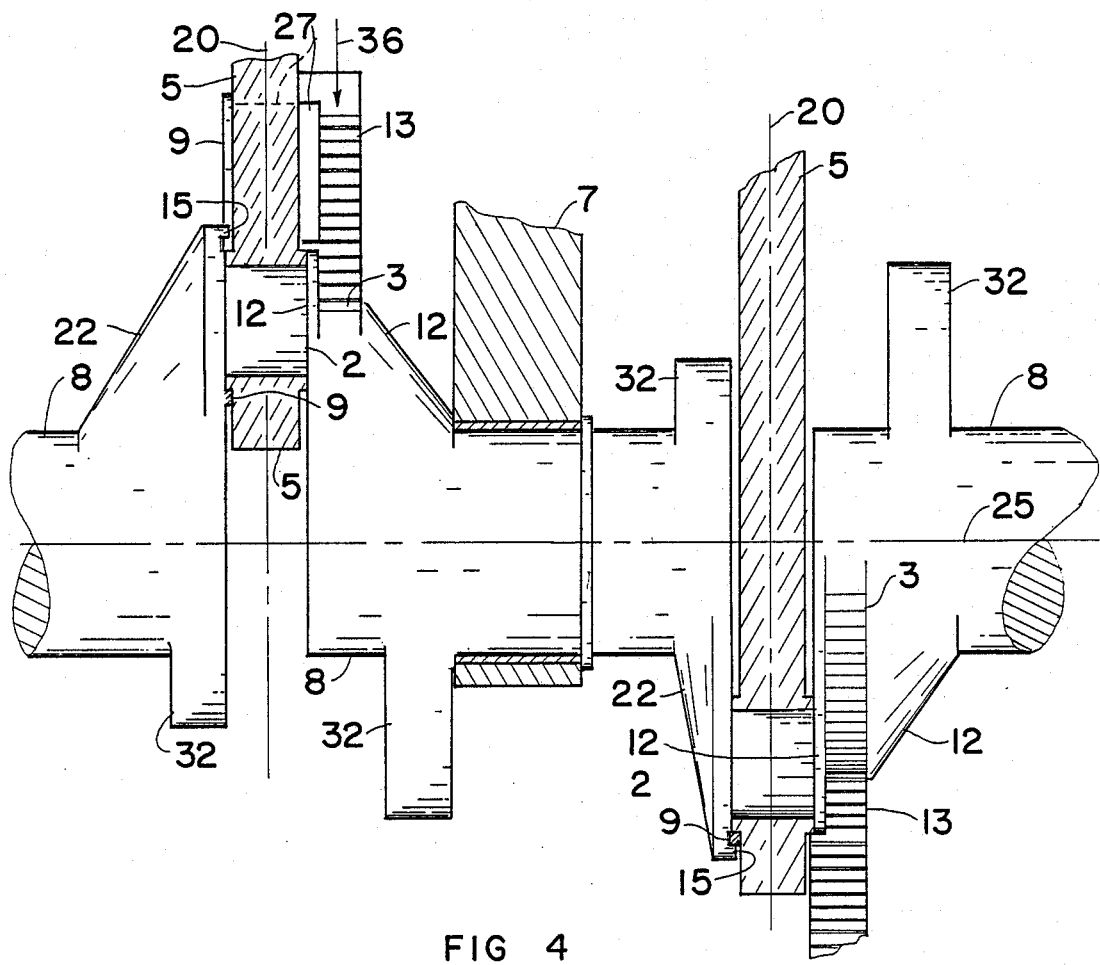
FIG. 4 shows two of a plurality of piston plates in relation to the power output shaft.

The crank arm 22 is provided with a guide pin 15 extending toward the plate 5 as profiled in FIG. 4. Secured to the plate 5, along the edge of slot 4, is a guide rail 9 which is engageable by pin 15. The rail 9 extends along at least part of the edge of slot 4 and it is molded so that the guide pin 15 fits around it to make a positive sliding engagement between the moving plate 5 and the revolving crank arm 22 during at least the part of the path 11 that precedes the entry of pin 2 into slot 1, e.g. the part of the slot shown to the left of center line 20 in FIG. 4. As mentioned, the gear 3 engages the gear 13 at the beginning of the downward stroke of piston 17. Gear 3 and gear 13 disengage at a designed point near the bottom of the downward stroke. The sliding engagement between rail 9 and pin 15 begins before gear 3 and gear 13 disengage.

Figure 3:
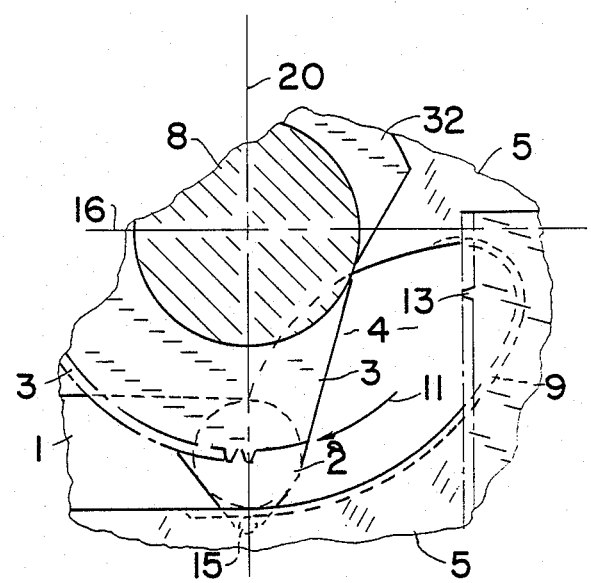
FIG. 3 shows the relationship between several elements of the invention as the crank pin transfers between the two parts of the slot in the piston plate.

The purpose of the sliding engagement between pin 15 and rail 9 is to positively control the downward movement of plate 5 when gears 13 and 3 are disengaged to insure that pin 2 is properly aligned to enter slot 1 at its bottom most position as shown in FIG. 3. There are other known methods that could be used in lieu of the sliding engagement to control plate 5 but they will be omitted in favor of brevity.

Figure 2:
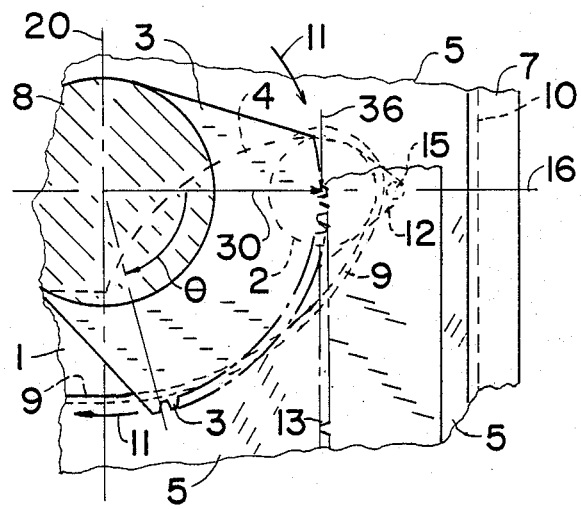
FIG. 2 shows the relationship between several elements of the invention at the position where the rack and pinion gears begin to disengage.

Crank arm 12 is preferably molded to include the sector gear 3. Gear 3 is centered at axis 25 as shown in FIG. 4. The arc of gear 3 encloses angle $\theta$ as shown in FIGS. 1 and 2. Rack gear 13 is precisely positioned on plate 5 so that it engages the sector gear 3 at the beginning of every downward stroke of piston 17. FIG. 1 shows the beginning of the power stroke. Modeling of this invention shows that gears 3 and 13 begin engagement at angle $\phi$ above the horizontal line 16 and disengage at angle $\phi$ below the horizontal line 16. It is known that the distance between the point of engagement and point of disengagement adds to the power stroke which is converted to rotational motion in shaft 8. In one model of this invention with a throw of 1.75 inches and a stroke of 3.5 inches, the engagement between gears 3 and 13 took place over a distance of about 3.125 inches, or about 89% of the length of the power stroke. The combustion power is almost depleted when gear 3 and gear 13 disengage so that there is very little force left to affect the sliding engagement between pin 15 and rail 9. However, as insurance, bumpers 39 (FIG. 1) made of slightly flexible material, can be secured to housing 7 to stop the downward movement of plate 5 where pin 2 enters slot 1.

The rack gear 13 is immovably attached to plate 5 as a separate element if it is not an integral part of plate 5. Lengthwise, gear 13 is parallel to the motion of piston 17. During the power stroke, this parallel arrangement creates two parallel force vectors 28 and 36 of the same magnitude which makes the force vector 36 acting through gear 13 essentially equal to the force vector 28 acting through piston 17. The total force vector 36 is applied perpendicularly to the fixed moment arm 30. There is a slight deviation through the two angles $\phi$ but its affect upon transmitting the power of piston 17 to the power shaft 8 is trivial. This feature is of very great importance for none of the piston's force is misdirected and lost as heat, etc., as it is in the conventional piston engine. Therefore, the torque applied to power shaft 8 is the product of essentially the total force 36 and the length of the moment arm 30. There is very little power loss due to friction since a gear is known to transmit power efficiently and the sliding engagement of groove 10, between plate 5 and housing 7, is well lubricated in the crankcase 37. Groove 10 is shown for illustrative purposes. Other, more efficient mechanisms may be used in lieu of groove 10.

A small clearance is maintained between plate 5 and pin 2 during the downward stroke of piston 17 when pin 2 is in slot 4. The slot 4, which is the part to the right of center line 20, is shaped substantially as shown in FIG. 1. This shape reflects the path 11 of pin 2 upon plate 5 during the downward movement of plate 5 as the rack gear 13 drives the sector gear 3 during the power stroke of piston 17, as well as the downward intake stroke, in the case of a 4 stroke. The shape of slot 4 continues until the crank pin 2 is precisely aligned to enter slot 1 (FIG. 3). The shape of slot 4 must be fairly accurate, especially along the edge holding rail 9, so that the plate 5 does not interfere with movement of pin 2 and vice versa.

As mentioned, the slot 1 is the part to the left of center line 20 in FIG. 1. Its shape is very different from the slot 4 part. Slot 1 is cut horizontally in plate 5. Slot 1 and pin 2 really act as a familiar scotch yoke to raise piston 17 to its position shown in FIG. 1 to begin another downward stroke. Clearance between pin 2 and slot 1 should be small primarily to control the motions of plate 5 and sector gear 3 near the topmost position of piston 17 (FIG. 1) so that gear 3 and gear 13 will properly engage. This requires the pin 2 and slot 1 to be rather precisely aligned (FIG. 3) when the pin 2, moving along its circular path 11, begins to enter slot 1 so that the pin 2 does not collide with the upper edge of slot 4. The slidable engagement between pin 15 and rail 9 will align the crank pin 2 and slot 1 correctly. However, if the angle $\theta$ is too large, it causes gear 3 to remain engaged with gear 13 too long. In this case, a jam, which must be avoided, will occur between pin 15 and rail 9.

Figure 5:
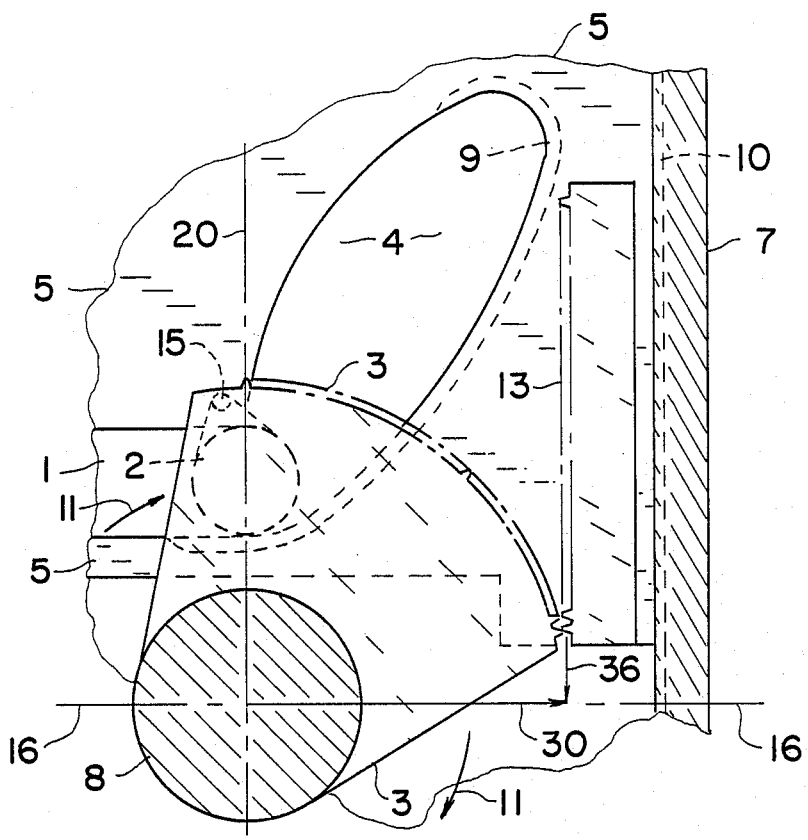
FIG. 5 shows the affect that an extension of the sector gear (moment arm) has on the relative positions of the rack gear and the part of the slot in the piston plate that lies to the right of the center line.

FIGS. 1-4 purposely show the radius of sector gear 3 (moment arm 30) to be shorter than the distance between axis 25 and outer perimeter of pin 2 while FIG. 5 shows the radius to be longer than the same distance between pin 2 and axis 25. This has an affect upon the positions of slot 4 relative to the gear 13. If the radius is shorter than the distance, as in FIG. 1, then a cavity 27 (FIG. 4) must be provided so that there is clearance between gear 13 and plate 5 to permit arm 12 to move without colliding with gear 13. Notice in FIG. 2, the position of pin 2 and arm 12 behind gear 13. The top part of gear 13 is shown broken away. This positioning of those parts occurs when the power shaft 8 has been rotated about 90° from its position shown in FIG. 1. At this position, the force vector 36 (equal to the vector 28) has diminished according to the well known combined gas law. Nevertheless, gear 13 is still transmitting the reduced power to gear 3 and gear 13 must be able to withstand the stress. In FIG. 5, this problem does not exist because there is no need for the cavity 27. For a given force 28, the two choices (FIG. 1 vs FIG. 5) affect power at shaft 8 by giving higher torque or higher rotation.

Figure 6:
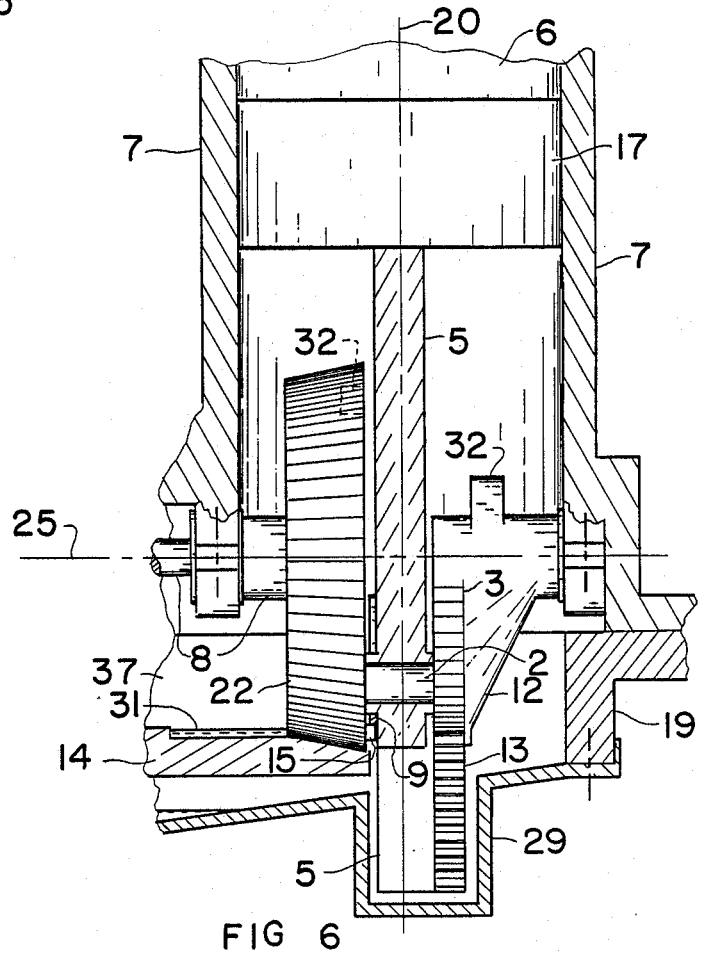
FIG. 6 shows another embodiment of this invention that is adapted to a replaceable power unit. The details of the power unit are found in the inventors' two related inventions; one having U.S. Ser. No. 06/768,683 and the other U.S. Pat. No. 4,632,081 dated Dec. 30, 1986.

The present invention can be made into power units that comprise a modular, easily repairable engine. FIG. 6 shows an embodiment of this invention that is particularly adapted for the power units in the continuation-in-part application of the Modular Engine (U.S. Ser. No. 06/768,683) and MODULAR ENGINE IMPROVEMENT (U.S. Pat. No. 4,632,081) inventions. FIG. 6 is more readily understood after understanding these two inventions. Certain elements shown in FIG. 6 are the same elements in the drawings of these other two inventions although some numerical designations are different. For instance, piston 17 in FIG. 6 is piston 9 in the other two inventions; housing 7 is housing 12, etc. Several common parts and details shown in the disclosures of the other two inventions have been deleted from FIG. 6.

In FIG. 6, housing 7 is part of a replaceable power unit that is attached to main housing 19. Main housing 19 is the housing for the main power shaft. Ring gear 14—part of the main output shaft—is driven by the pinion 22. The eccentric pin 2 rigidly combines pinion 22 and crank arm 12. Piston 17 drives the pinion 22 through the mesh between gear 3 and gear 13 as before. Pinion 22 also serves as the crank arm 22 described earlier. Counter weight 32 is part of pinion 22. The plate 5, with its rail 9, is the same as already described. The pin 15 is part of the pinion 22 and its relation to rail 9 to control movement of plate 5 is the same as described earlier. Power shaft 8 is rotatably carried by the power unit 7 in FIG. 6. Shaft 8 serves as a cam shaft (shown broken away in FIG. 6) for a two stroke power unit. A 2:1 gear reduction between shaft 8 and a second cam shaft, also carried by housing 7, is needed for a four stroke. This feature is detailed in the disclosures of the other two inventions. There are preferably several independent power units meshing with the ring gear 14 to drive a common power shaft. The ring gear 14 effects timing between the several power units but the timing of all the parts within each power unit is independent of external influence so that each power unit is completely bench repairable.

It can be appreciated that there will be lower combustion pressures and temperatures than that found in conventional crank engines. A longer piston stroke can be used. Lower rpm with longer residence time can be designed into this invention. This combination of advantages gives a more efficient conversion of fuel energy to mechanical energy which allows consideration of low energy methyl or ethyl alcohol fuels.

OPERATION

The relative movements of the parts become more apparent by using line 20, line 16, and line 25 as references. As mentioned, these lines remain fixed in their respective planes. The invention can be a two or four stoke reciprocating engine. It is started by conventionally rotating shaft 8 with a starter. In FIG. 1, the crank pin 2 is at center line 20 between slot 1 and slot 4 which occurs at TDC (0°). The rack gear 13 is at its topmost position. The piston rod part of plate 5 extends into clinder 6. Assume that FIG. 1 shows the beginning of the power stroke. For a four stroke engine, this is also the beginning of the intake stroke (360°). In the power stroke, the combustion gases in the combustion chamber 31 drive piston 17 downward as indicated by force vector 28. The one piece piston rod plate 5 is driven linearly downward along line 20 by the force 28. Simultaneously, pin 2 is revolving along its circular path 11, shown in a clockwise direction. The movement of pin 2 is caused by either a starter or the other of a plurality of angularly displaced plates 5 along shaft 8 (FIG. 4). Immediately, the plate 5 slips off the pin 2. At this time, sector gear 3 engages rack gear 13 at a point above line 16 indicated by angle $\phi$. This action causes the force vector 28 to appear as force vector 36 at gear 13. All the force is perpendicular to the fixed moment arm 30 and transmitted to the power shaft 8 through the mesh between gear 3 and gear 13.

Gear 13 only meshes with gear 3 during the downward stroke of piston 17. The distance traveled by gear 13 during its mesh with gear 3 is equal to the length of the arc subtended by angle $\theta$ plus twice the length of the arc subtended by angle $\phi$ (FIG. 1). This distance is also the length of the power stroke of piston 17 during which power is transmitted to shaft 8. Obviously, a long power stroke is allowed.

The rack gear 13 engages from sector gear 3 at a point below line 16 where angle $\theta$ intersects the downward path of gear 13. Before gear 13 and gear 3 disengage, the guide pin 15 begins its sliding engagement with rail 9 as shown in FIG. 2. These sliding elements are in crankcase 37 so it is easy to keep them lubricated with oil 31. Pin 2 automatically aligns along the edge of slot 4 so that plate 5, through rail 9, is coupled between pin 2 and pin 15. Pin 15 and rail 9 continue their sliding engagement as the crank pin 2 continues to revolve which keeps the movement of plate 5 synchronized with the movement of pin 2. This controlled, synchronized movement aligns pin 2 perfectly to enter slot 1 at BDC (180°) as shown in FIG. 3. With proper design, there will be very little force between plate 5 and pin 15 after gears 3 and 13 disengage and before pin 2 enters slot 1, therefore, any resistance to aligning pin 2 with slot 1 is negligible.

Pin 2 will continue to revolve along path 11 after it enters slot 1. In a multi cylinder engine—inferred from FIG. 4—the power from the other pistons will cause pin 2 to continue to revolve on path 11. As pin 2 continues, being between 180° and 360°, it lifts plate 5 and piston 17 to return piston 17 to TDC (360°) for completing the exhaust stroke. The slot 1 and pin 2 form a scotch yoke used to raise piston 17.

When piston 17 is in the position shown in FIG. 1, it will be ready to begin another power stroke or an intake stroke. If the invention is in a 4 stroke engine, the next stroke will be an intake stroke. At the beginning of the intake stroke, the pin 2 continues to revolve through TDC (360°). The sector gear 3 engages gear 13 as in the power stroke but, this time the gear 3 pulls gear 13 downward which also pulls piston 17 down to effect the intake stroke. Obviously, the force vectors 28, 36 are absent during the intake stroke. Before gears 13 and 3 disengage, the rail 9 will engage pin 15 (FIG. 2) as described for the power stroke and again align pin 2 to enter slot 1. After entering slot 1, the pin 2 will force piston 17 upward on the compression stroke and position piston 17 at TDC (FIG. 1) for another power stroke.

Notice that the upward velocity of piston 17 increases until pin 2 is at 270° and then decreases, just as in a conventional crank coupling. The piston is nearly standing still shortly before TDC. For instance, with a 2 inch throw, the piston is already less than 1/32 inch from TDC when it is at 350° (10° before BTDC). At 355° (5° BTDC), piston 17 is about 1/128 inch from its topmost position and still precisely controlled by the scotch yoke of slot 1 with pin 2. Our models show that the gears 3 and 13 engage perfectly during rotation of shaft 8 which infers that there is no loss of control after TDC.

The form of the invention herewith shown and described is not to be taken as the only preferred embodiment of the invention. Various changes may be made to the dimensions, angles, shapes and sizes of the parts and movements. Equivalent elements may be substituted for those illustrated and described. Parts may be reversed and certain features of the invention may be used independently of other features, all without departing from the intent and scope of the invention. Examples include, but are not limited to the following:

a. Gears 13 and 3 may be herringbone or any other kind. One or both may be comprised of high pressure laminate or other material which has reslience to absorb the initial shock load from combustion.

b. slots 1, 4 may drop below path 11 at line 20 and then raised to align pin 2 for entry into slot 1.

c. a catch may be provided between gear 3 and 13 to absorb part of the initial shock load as they engage on the power stroke. For example, a spur on gear 3 seats in a matching part of gear 13 at TDC until an empirical angle is reached when the spur automatically slips out of engagement with the matching part.

We claim:

1. An apparatus for converting motion between linear reciprocal motion and rotary motion, the combination comprising:
   a housing;
   a power shaft rotatably supported by the housing;
   at least one first element capable of linear reciprocal motion;
   the first element supported by the housing;
   a first communication means between the first element and the power shaft for transmitting the motion between a first reciprocal motion and said rotary motion;
   the first communication means comprising a fixed length moment arm; and
   a second communication means between the first element and the power shaft for transmitting the motion between a second reciprocal motion and said rotary motion wherein the second communication means comprises a scotch yoke.

2. The combination of claim 1 in which the first element includes a power piston.

3. The combination of claim 1 in which the first communication means includes:
   a sector gear nonrotatable secured to the power shaft;
   the first element comprising a rack gear;
   the sector gear in mesh with the rack gear; and
   the moment arm includes at least one radial of the sector gear.

4. The combination of claim 3 in which the first communication means converts the linear motion to said rotary motion.

5. The combination of claim 1 in which:
   the linear reciprocal motion essentially occurs along an axis of the first element;
   the first element further comprises a plate;
   the plate includes an essentially straight slot on one side of the axis;
   the power shaft comprises a crank pin; and
   an engagement between the crank pin and the straight slot for effecting the scotch yoke wherein the rotary motion is converted to the linear motion during operation of the second communication means.

* * * * *